(12) United States Patent
Hwang et al.

(10) Patent No.: US 12,002,594 B2
(45) Date of Patent: Jun. 4, 2024

(54) METHOD FOR DECOMMISSIONING NUCLEAR FACILITIES

(71) Applicant: KOREA HYDRO & NUCLEAR POWER CO., LTD., Gyeongju-si (KR)

(72) Inventors: Young Hwan Hwang, Daejeon (KR); Seok-Ju Hwang, Daejeon (KR); Mi-Hyun Lee, Daejeon (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 349 days.

(21) Appl. No.: 17/437,080

(22) PCT Filed: Mar. 5, 2020

(86) PCT No.: PCT/KR2020/003107
§ 371 (c)(1),
(2) Date: Sep. 8, 2021

(87) PCT Pub. No.: WO2020/184897
PCT Pub. Date: Sep. 17, 2020

(65) Prior Publication Data
US 2022/0165440 A1    May 26, 2022

(30) Foreign Application Priority Data
Mar. 8, 2019  (KR) .................. 10-2019-0027065

(51) Int. Cl.
*G21D 1/00*     (2006.01)

(52) U.S. Cl.
CPC .................. *G21D 1/003* (2013.01)

(58) Field of Classification Search
CPC .................. G21F 9/28; G21D 1/003
See application file for complete search history.

(56) References Cited

U.S. PATENT DOCUMENTS

| | | |
|---|---|---|
| 6,186,568 B1 | 2/2001 | Sridhar et al. |
| 2010/0004498 A1 | 1/2010 | Binner |

FOREIGN PATENT DOCUMENTS

| | | |
|---|---|---|
| JP | 60-093399 | 5/1985 |
| JP | 10-120359 | 5/1998 |
| JP | 11-248888 | 9/1999 |
| JP | 2005-308626 | 11/2005 |
| JP | 2006-098165 | 4/2006 |
| JP | 4850214 | 1/2012 |
| KR | 10-2003-0040576 | 5/2003 |
| KR | 10-2015-0073536 | 7/2015 |
| KR | 1754538 | 7/2017 |
| WO | 2020-009476 | 1/2020 |

*Primary Examiner* — Moshe Wilensky
(74) *Attorney, Agent, or Firm* — LEX IP MEISTER, PLLC

(57) ABSTRACT

A method for decommissioning a nuclear facility includes: floating the nuclear reactor pressure vessel above the cavity; rotating the reactor pressure vessel so that the upper portion of the nuclear reactor pressure vessel is closer to the bio-protective concrete than the lower portion; mounting the upper portion of the nuclear reactor pressure vessel on the neighboring upper surface of the bio-protective concrete; and cutting and decommissioning the nuclear reactor pressure vessel mounted on the neighboring upper surface.

4 Claims, 8 Drawing Sheets

METHOD FOR DECOMMISSIONING NUCLEAR FACILITIES

TECHNICAL FIELD

The present disclosure relates to a method for decommissioning a nuclear facility.

BACKGROUND ART

Generally, among nuclear facilities used for nuclear power generation, a pressurized water reactor type of nuclear power plant includes a nuclear reactor pressure vessel and bio-protective concrete for surrounding the nuclear reactor pressure vessel.

When decommissioning a nuclear facility, it is necessary to separate the nuclear reactor pressure vessel from the bio-protective concrete, and to cut and decommission the nuclear reactor pressure vessel.

DISCLOSURE

Technical Problem

An embodiment is to provide a method for decommissioning a nuclear facility that easily cuts and decommissions a nuclear reactor pressure vessel separated from bio-protective concrete.

Technical Solution

An embodiment provides a method for decommissioning a nuclear facility that includes a nuclear reactor pressure vessel provided with a hemispherical lower portion and a flat upper portion, and bio-protective concrete including a cavity in which the nuclear reactor pressure vessel is positioned and a neighboring upper surface adjacent to the cavity, including: floating the nuclear reactor pressure vessel above the cavity; rotating the reactor pressure vessel so that the upper portion of the nuclear reactor pressure vessel is closer to the bio-protective concrete than the lower portion; mounting the upper portion of the nuclear reactor pressure vessel on the neighboring upper surface of the bio-protective concrete; and cutting and decommissioning the nuclear reactor pressure vessel mounted on the neighboring upper surface.

The nuclear facility may further include a first crane positioned above the bio-protective concrete, and the floating of the nuclear reactor pressure vessel above the cavity may be performed by using the first crane.

The floating of the nuclear reactor pressure vessel above the cavity may include: connecting the first crane to the upper portion of the nuclear reactor pressure vessel; and lifting the nuclear reactor pressure vessel from the bio-protective concrete by using the first crane.

The nuclear facility may further include a second crane that is positioned above the bio-protective concrete and is adjacent to the first crane, and the rotating of the nuclear reactor pressure vessel may be performed by using the first crane and the second crane.

The rotating of the nuclear reactor pressure vessel may include: connecting the second crane to the lower portion of the nuclear reactor pressure vessel; positioning the upper portion of the nuclear reactor pressure vessel on the neighboring upper surface of the bio-protective concrete slab by using the first crane; lifting the lower portion of the nuclear reactor pressure vessel by using the second crane; and positioning the lower portion of the nuclear reactor pressure vessel on the neighboring upper surface of the bio-protective concrete slab by using the second crane.

The rotating of the nuclear reactor pressure vessel may include rotating the nuclear reactor pressure vessel by 180 degrees.

The nuclear facility may further include a plurality of pipes directly connected to the nuclear reactor pressure vessel, and the method may further include: expanding an inner wall of the bio-protective concrete forming the cavity; and separating the plurality of pipes from the nuclear reactor pressure vessel.

Advantageous Effects

According to the embodiment, a method for decommissioning a nuclear facility that easily cuts and decommissions a nuclear reactor pressure vessel separated from bio-protective concrete is provided.

MODE FOR INVENTION

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In addition, unless explicitly described to the contrary, the word "comprise" and variations such as "comprises" or "comprising" will be understood to imply the inclusion of stated elements but not the exclusion of any other elements.

Hereinafter, a method for decommissioning a nuclear facility according to an embodiment will be described with reference to FIG. 1 to FIG. 8.

Hereinafter, a pressurized water reactor (PWR) type of nuclear power plant will be exemplified as the nuclear facility, and without being limited to this, the nuclear facility may be a boiling water reactor (BWR) type of nuclear power plant.

The pressurized water reactor type of nuclear power plant uses light-water as a coolant and moderator, and uranium 235 is concentrated to about 2% to 4% to be used as nuclear fuel. A pressurized light-water reactor type of nuclear power plant is divided into a facility related to a nuclear reactor system that transmits heat generated by nuclear fission within a reactor to a steam generator for heat exchange; and a facility related to a turbine and generator system that turns a turbine with steam generated from the steam generator, returns it to water through a condenser, and then circulates it back to the steam generator.

Generally, a coolant (light-water), which is a heat transfer medium of a nuclear reactor system, is heated to about 320° C. in a nuclear reactor and pressurized to about 153 atmospheres so that it does not boil. Equipment configuring the system includes a pressurizer that adjusts pressure to maintain a constant enthalpy, and a coolant pump that circulates the coolant between the reactor and the steam generator. A system in which the steam generated from the steam generator rotates the turbine to generate power from a generator connected to a turbine shaft may be the same as that of a general thermal power plant.

Figure 1:
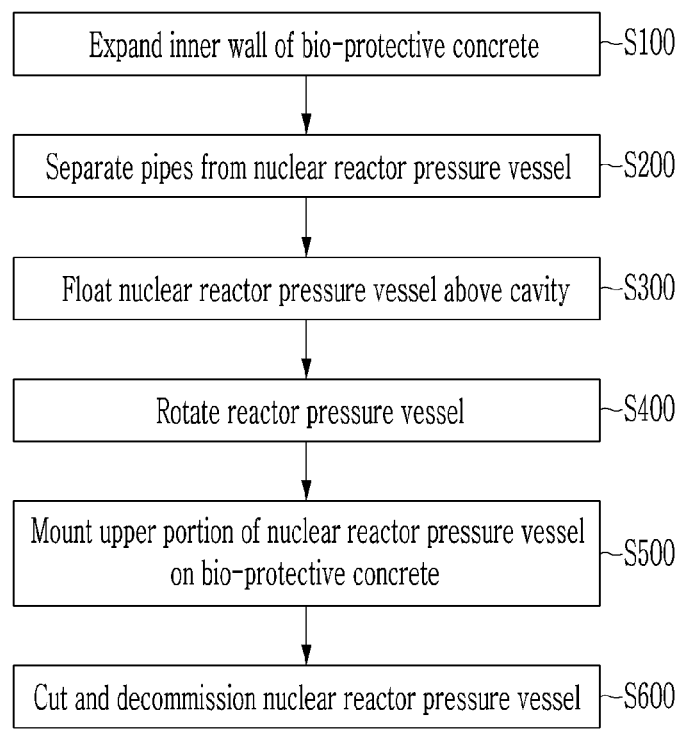
FIG. 1 illustrates a flowchart of a method for decommissioning a nuclear facility according to an embodiment.

FIG. 1 illustrates a flowchart of a method for decommissioning a nuclear facility according to an embodiment.

FIG. 2 to FIG. 8 are drawings for explaining a method for decommissioning a nuclear facility according to an embodiment.

Figure 2:
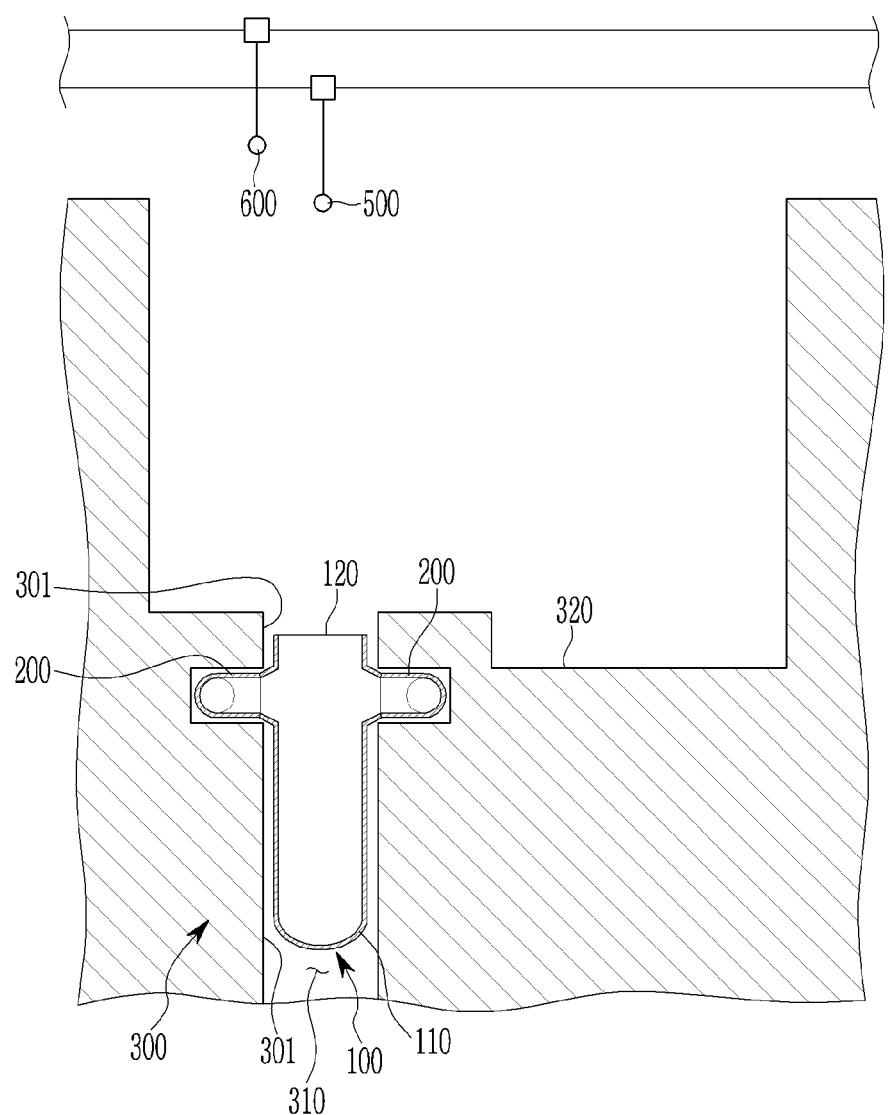
FIG. 2 to FIG. 8 are drawings for explaining a method for decommissioning a nuclear facility according to an embodiment.
Figure 3:
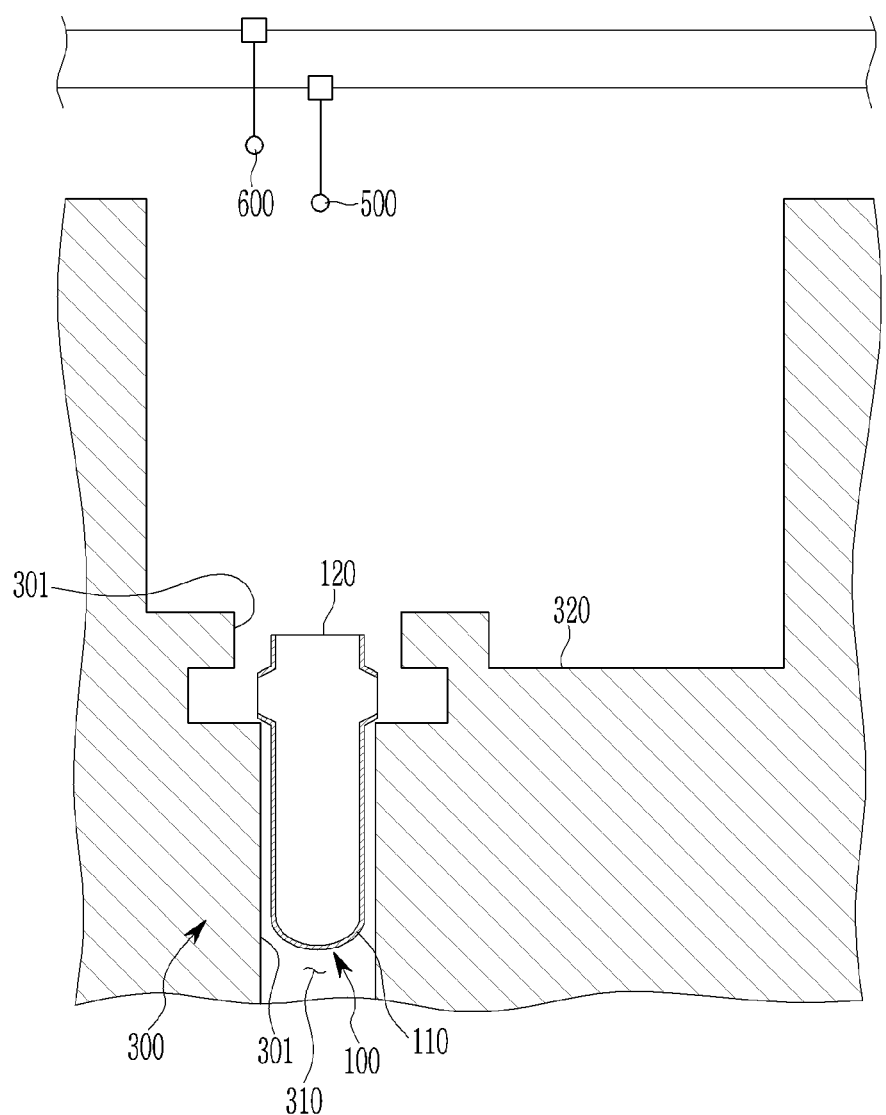

First, referring to FIG. 1 to FIG. 3, an inner wall 301 of bio-protective concrete 300 is expanded (S100).

FIG. 2 is a drawing of a part of a nuclear facility.

Specifically, referring to FIG. 2, the nuclear facility includes a nuclear reactor pressure vessel 100, a plurality of pipes 200 directly connected to the nuclear reactor pressure vessel 100, bio-protective concrete 300 surrounding the nuclear reactor pressure vessel 100 and the pipes 200 and supporting the nuclear reactor pressure vessel 100, a first crane 500, and a second crane 600. The nuclear facility may further include various known configurations in addition to the configurations shown in FIG. 2.

The nuclear reactor pressure vessel 100 may be a pressurized water reactor type, but is not limited thereto. For example, the nuclear reactor pressure vessel 100 may be a boiling water reactor type.

The nuclear reactor pressure vessel 100 includes a hemisphere-shaped lower portion 110 and a flat upper portion 120.

In the lower portion 110 of the nuclear reactor pressure vessel 100, various known nozzle through-holes into which in-core instrumentation members such as an in core instrumentation (101) nozzle may be inserted may be formed.

Various known bolt penetrating holes into which fastening members such as stud bolts may be inserted so that a pressure vessel head covering the nuclear reactor pressure vessel 100 may be mounted on the upper portion 120 of the nuclear reactor pressure vessel 100 may be formed.

The plurality of pipes 200 are connected to various types of known steam generators. Hot water may pass through one of the pipes 200, and cold water may pass through the other pipe thereof, but the present invention is not limited thereto.

The bio-protective concrete 300 includes a cavity 310 in which the nuclear reactor pressure vessel 100 is positioned, the inner wall 301 forming the cavity 310 and facing the nuclear reactor pressure vessel 100, and a neighboring upper surface 320 adjacent to the cavity 310. The neighboring upper surface 320 of the bio-protective concrete 300 may be an upper surface of various known types of the bio-protective concrete 300 adjacent to the cavity 310.

The first crane 500 is positioned above the bio-protective concrete 300. The first crane 500 may be a crane used when the nuclear facility is initially installed, but is not limited thereto, and may be an additionally installed crane.

The second crane 600 is positioned above the bio-protective concrete 300. The second crane 600 is adjacent to the first crane 500. The second crane 600 may be a crane used when the nuclear facility is initially installed, but is not limited thereto, and may be an additionally installed crane.

FIG. 3 illustrates a state in which the inner wall of the bio-protective concrete is expanded and the pipes are separated from the nuclear reactor pressure vessel in the nuclear facility shown in FIG. 2.

Referring to FIG. 2 and FIG. 3, the inner wall 301 of the bio-protective concrete slab 300 forming the cavity 310 is cut and expanded by using a cutting member such as a wire saw or a circular saw. In FIG. 3, a portion of the inner wall 301 adjacent to the pipes 200 is expanded, but the present invention is not limited thereto, and the other portion of the inner wall 301 corresponding to the nuclear reactor pressure vessel 100 may be expanded.

As the inner wall 301 of the bio-protective concrete 300 is expanded, the pipes 200 are exposed in an upper direction.

Meanwhile, before expanding the inner wall 301 of the bio-protective concrete 300, insulation surrounding the nuclear reactor pressure vessel 100 may be removed.

Next, the pipes 200 are separated from the nuclear reactor pressure vessel 100 (S200).

Specifically, the pipes 200 exposed through the expanded inner wall 301 of the bio-protective concrete 300 are cut in a diameter direction of the pipes 200, and the pipes 200 are separated from the nuclear reactor pressure vessel 100.

The cutting of the pipes 200 may be performed by using a wire saw, but is not limited thereto, and may be performed by using another cutting member such as a circular saw.

Since the pipes 200 are completely exposed through the expanded inner wall 301, the pipes 200 may be easily cut through the expanded inner wall 301 by using a cutting member.

Figure 4:
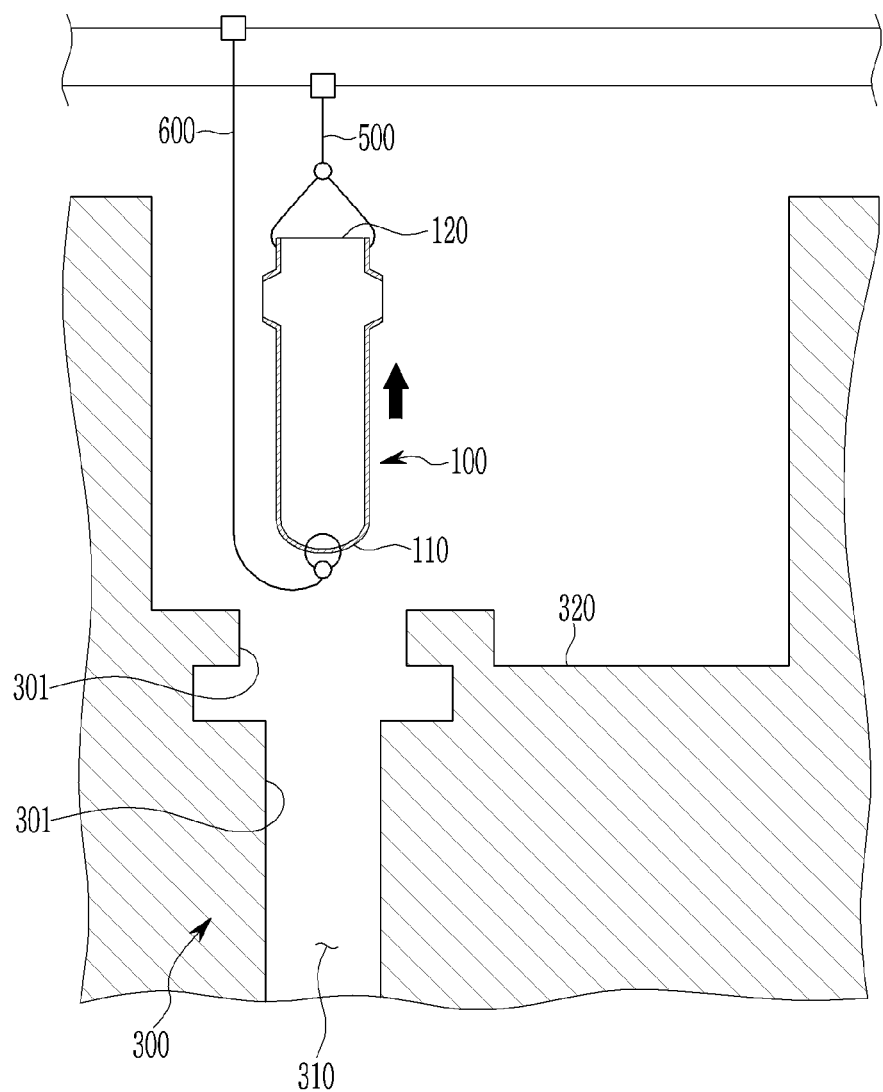

FIG. 4 is a drawing in which the nuclear reactor pressure vessel is floating above the cavity in the nuclear facility shown in FIG. 3.

Next, referring to FIG. 4, the nuclear reactor pressure vessel 100 is floating above the cavity 310 (S300).

Specifically, the nuclear reactor pressure vessel 100, whose pipes are cut through the expanded inner wall 301 of the bio-protective concrete 300, is lifted from the bio-protective concrete 300 by using the first crane 500 to be floating above the cavity 310 of the bio-protective concrete slab 300.

In this case, the first crane 500 is connected to the upper portion 120 of the nuclear reactor pressure vessel 100. For example, the first crane 500 is connected to the bolt penetrating holes formed in the upper portion 120 of the nuclear reactor pressure vessel 100, into which stud bolts may be inserted, so that the first crane 500 may be connected to the upper portion 120 of the nuclear reactor pressure vessel 100, but is not limited thereto.

Then, the nuclear reactor pressure vessel 100 is lifted from the bio-protective concrete 300 by using the first crane 500 to float the nuclear reactor pressure vessel 100 in the cavity 310 of the bio-protective concrete 300.

Since the pipes connected to the nuclear reactor pressure vessel 100 are cut and separated through the expanded inner wall 301, the nuclear reactor pressure vessel 100 may be easily lifted from the bio-protective concrete 300 without interference by the bio-protective concrete 300 and the pipes.

Figure 5:
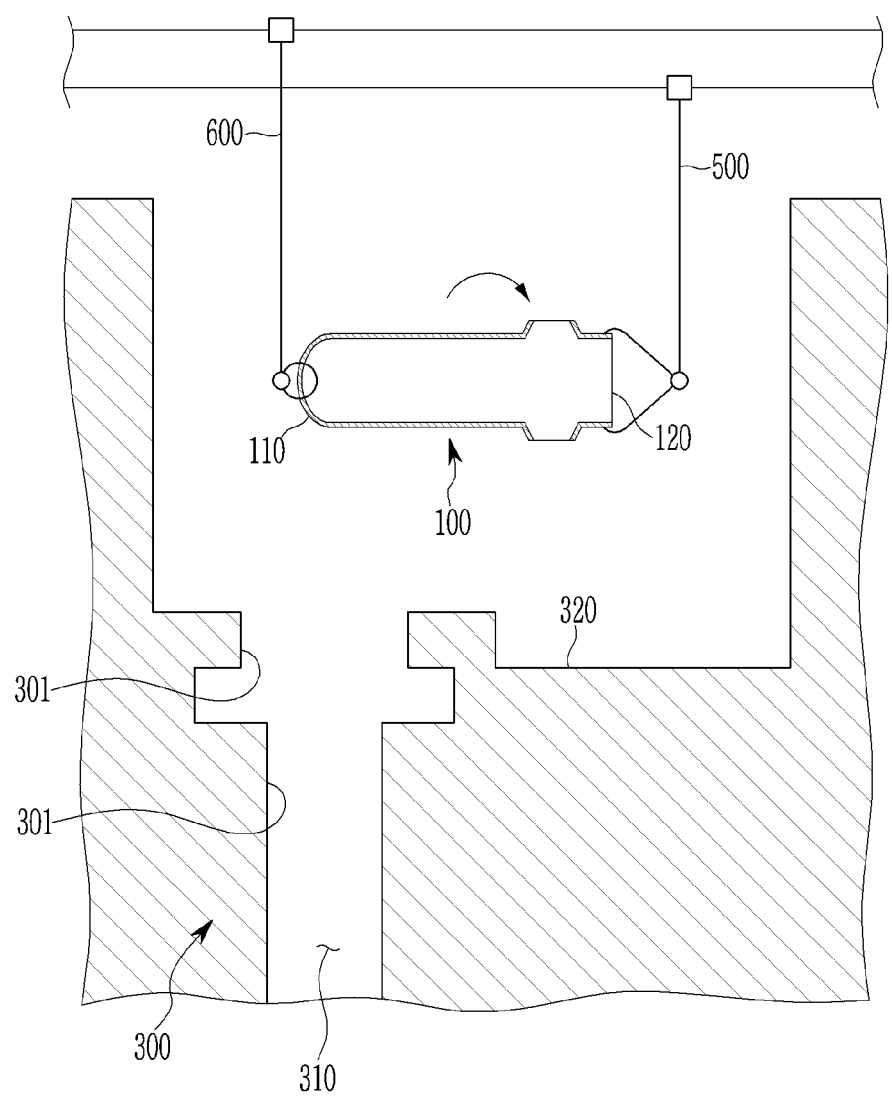

FIG. 5 illustrates a state in which the nuclear reactor pressure vessel is rotated by 90 degrees in a clockwise direction in the nuclear facility shown in FIG. 4.

Figure 6:
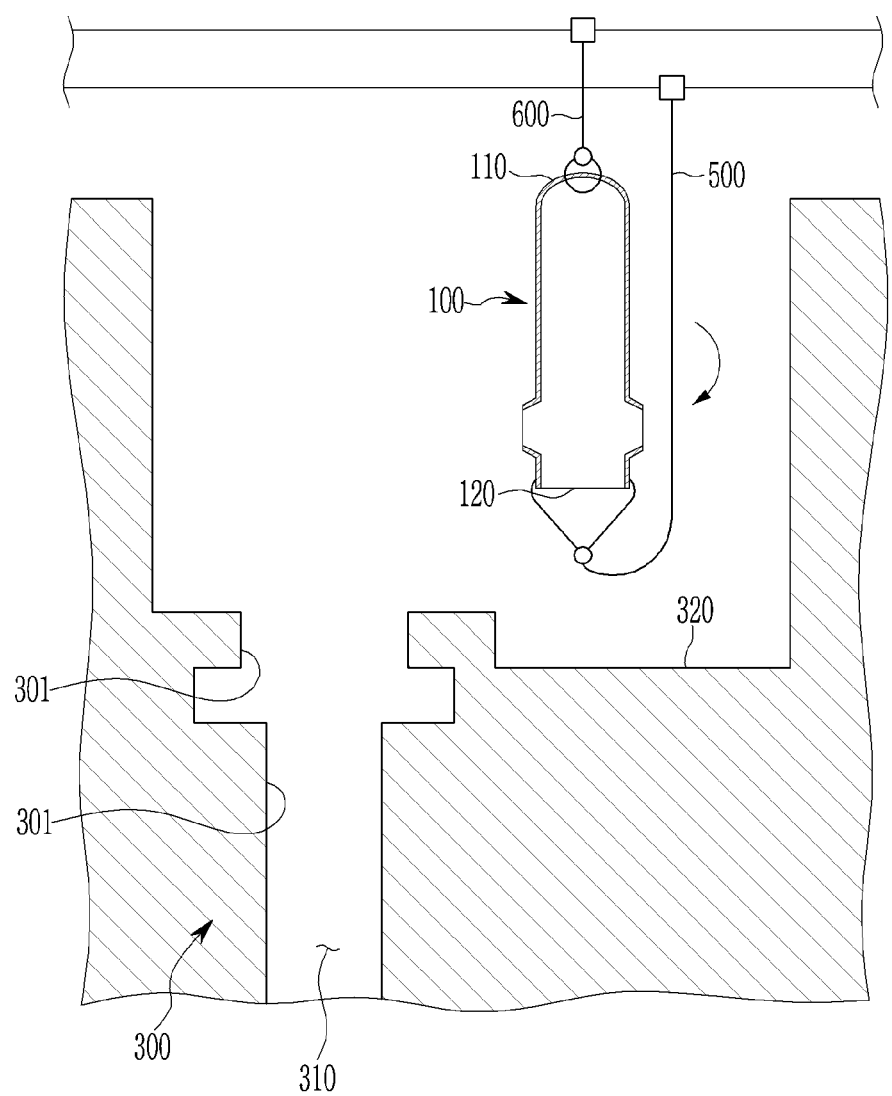

FIG. 6 illustrates a state in which the nuclear reactor pressure vessel rotated by 90 degrees in the nuclear facility shown in FIG. 5 is rotated by 90 degrees in the clockwise direction again.

Next, referring to FIG. 4 to FIG. 6, the nuclear reactor pressure vessel 100 is rotated (S400).

Specifically, the nuclear reactor pressure vessel 100 is rotated by 180 degrees in the clockwise direction so that the upper portion 120 of the nuclear reactor pressure vessel 100 is closer to the neighboring upper surface 320 of the bio-protective concrete 300 compared to the lower portion 110 of the nuclear reactor pressure vessel 100 by using the first crane 500 and the second crane 600.

First, referring to FIG. 4, the second crane 600 is connected to the lower portion 110 of the nuclear reactor pressure vessel 100.

For example, the second crane 600 is connected to the nozzle penetrating holes formed in the lower portion 110 of the nuclear reactor pressure vessel 100, into which ICI nozzles may be inserted, so that the second crane 600 may be connected to the lower portion 110 of the nuclear reactor pressure vessel 100, but is not limited thereto.

Next, referring to FIG. 5, the first crane 500 is used to position the upper portion 120 of the nuclear reactor pressure vessel 100 above the neighboring upper surface 320 of the bio-protective concrete 300.

For example, by moving the first crane 500 from an upper side of the cavity 310 to an upper side of the neighboring upper surface 320, the upper portion 120 of the nuclear reactor pressure vessel 100 connected to the first crane 500 may be moved from the upper side of the cavity 310 to the upper side of the neighboring upper surface 320.

Next, the second crane 600 lifts the lower portion 110 of the nuclear reactor pressure vessel 100.

For example, by upwardly moving the lower portion 110 of the nuclear reactor pressure vessel 100 in which the upper portion 120 thereof is moved to the upper side of the neighboring upper surface 320 above the cavity 310 by using the second crane 600, the nuclear reactor pressure vessel 100 may be clockwise rotated by 90 degrees.

Next, referring to FIG. 6, the second crane 600 is used to position the lower portion 110 of the nuclear reactor pressure vessel 100 above the neighboring upper surface 320 of the bio-protective concrete 300.

For example, the second crane 600 is moved from the upper side of the cavity 310 to the upper side of the neighboring upper surface 320 to move the lower portion 110 of the nuclear reactor pressure vessel 100 connected to the second crane 600 from the upper side of the cavity 310 to the upper side of the neighboring top surface 320, thereby clockwise rotating the nuclear reactor pressure vessel 100, which is clockwise rotated by 90 degrees, by 90 degrees again.

In this case, the lower portion 110 of the nuclear reactor pressure vessel 100 may be upwardly moved above the neighboring upper surface 320 by using the second crane 600, and the upper portion 120 of the nuclear reactor pressure vessel 100 may be downwardly moved above the neighboring upper surface 320 by using the first crane 500.

That is, the nuclear reactor pressure vessel 100 floating above the cavity 310 is clockwise rotated by 180 degrees by using the first crane 500 and the second crane 600 to be positioned upside down above the neighboring upper surface 320.

Figure 7:
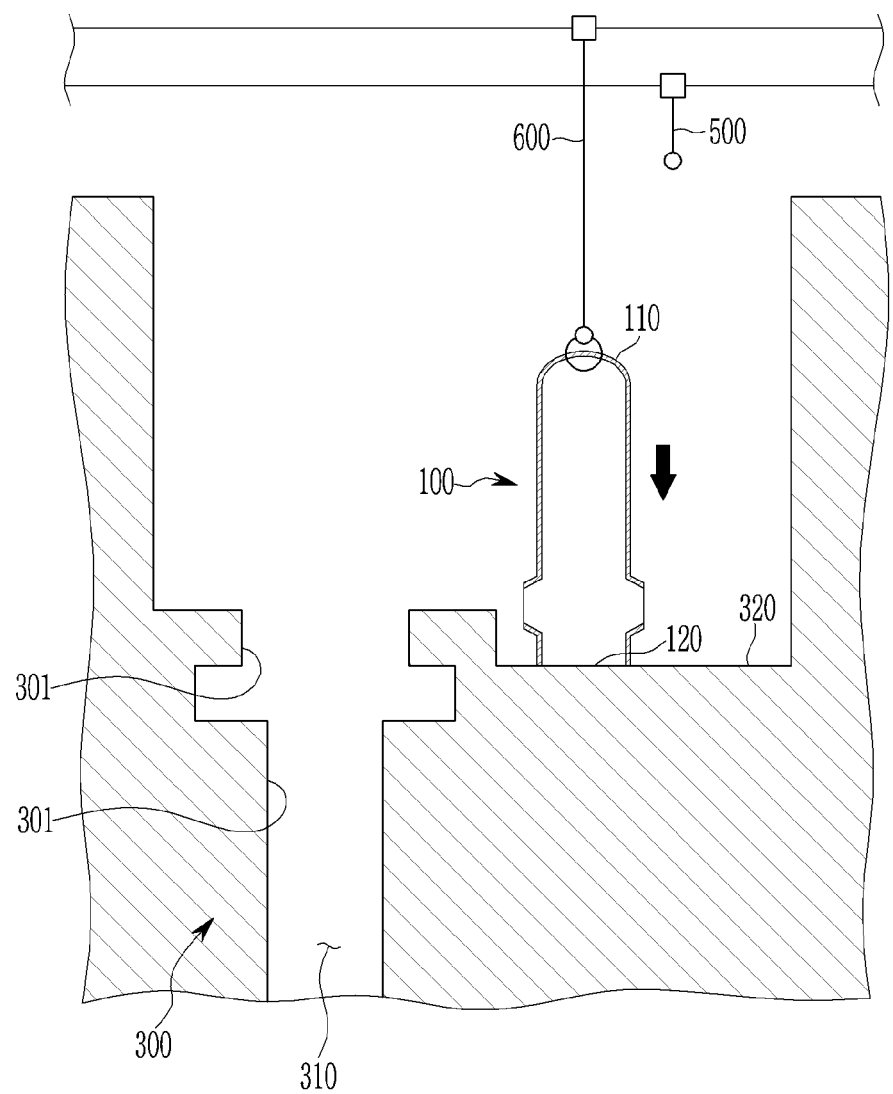

FIG. 7 illustrates a drawing in which the nuclear reactor pressure vessel is mounted upside down on the neighboring upper surface in the nuclear facility shown in FIG. 6.

Next, referring to FIG. 7, the upper portion 120 of the nuclear reactor pressure vessel 100 is mounted on the bio-protective concrete 300 (S500).

Specifically, the nuclear reactor pressure vessel 100 positioned upside down on the neighboring upper surface 320 of the bio-protective concrete 300 is mounted upside down on the neighboring upper surface 320 by using the second crane 600.

In this case, the flat upper portion 120 of the nuclear reactor pressure vessel 100 is mounted on the neighboring upper surface 320 of the bio-protective concrete 300. The first crane 500 may be separated from the upper portion 120 of the nuclear reactor pressure vessel 100, but is not limited thereto, and may maintain a state of being connected to the upper portion 120 of the nuclear reactor pressure vessel 100.

The flat upper portion 120 of the nuclear reactor pressure vessel 100 is mounted on the neighboring upper surface 320, so that the reactor pressure vessel 100 is supported on the neighboring upper surface 320 of the bio-protective concrete 300 without shaking.

Figure 8:
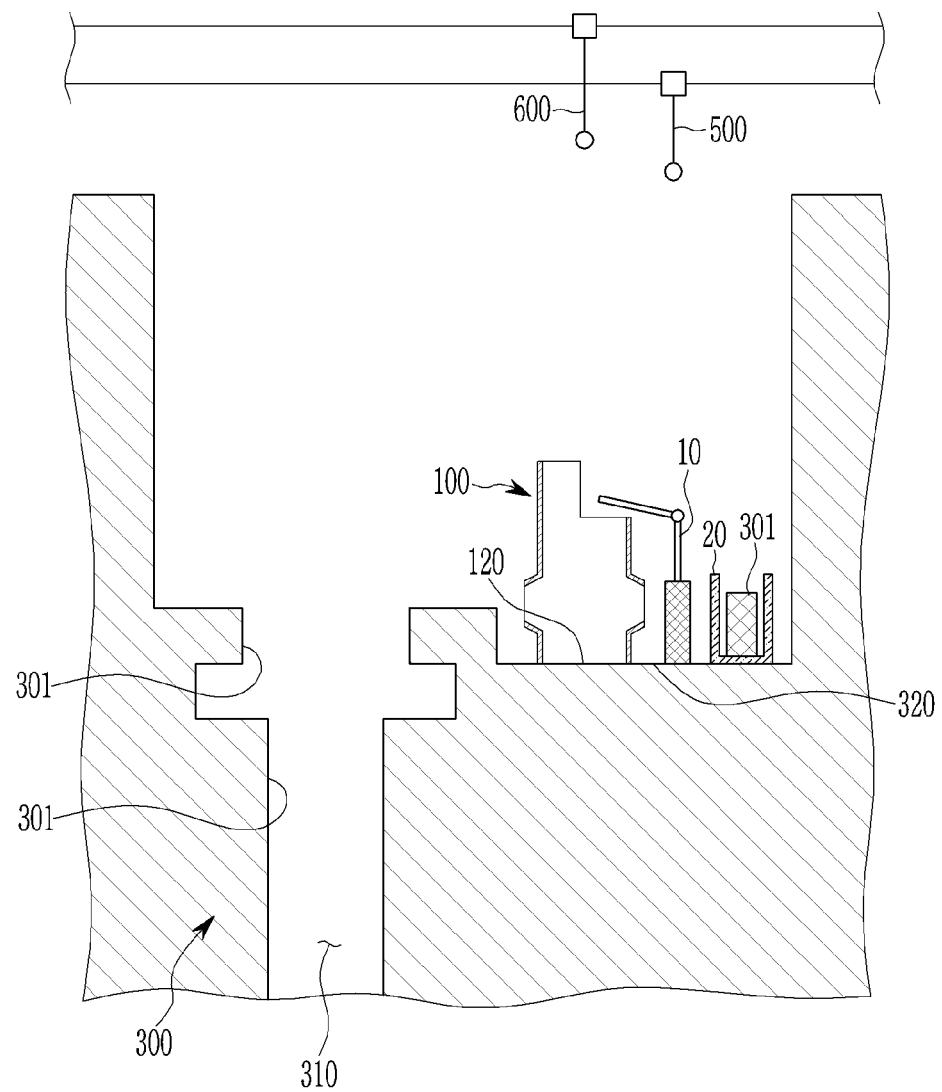

FIG. 8 illustrates a state in which the nuclear reactor pressure vessel mounted upside down on the neighboring upper surface in the nuclear facility shown in FIG. 7 is partially cut and decommissioned by using a cutting device.

Next, referring to FIG. 8, the nuclear reactor pressure vessel 100 is cut and decommissioned (S600).

Specifically, the nuclear reactor pressure vessel 100 mounted on the neighboring upper surface 320 of the bio-protective concrete 300 is cut and decommissioned.

The nuclear reactor pressure vessel 100 mounted upside down on the neighboring upper surface 320 of the bio-protective concrete 300 is cut and decommissioned from the upper portion to the lower portion of the reactor pressure vessel 100, which is mounted upside down, by using a cutting device 10 installed on the bio-protective concrete 300, so that the nuclear reactor pressure vessel 100 may be cut and decommissioned.

The cutting device 10 may include an end effector including a cutting member such as a laser cutter and a grip member such as a gripper.

The cutting device 10 may allow a pressure vessel piece 101 cut and decommissioned from the nuclear reactor pressure vessel 100 to be accommodated in a standard size of packaging container 20. The packaging container 20 in which the pressure vessel piece 101 is stored may be sealed and taken out of the nuclear facility.

The cutting and decommissioning of the nuclear reactor pressure vessel 100 using the cutting device 10 may be performed in the state in which the first crane 500 and the second crane 600 are separated from the nuclear reactor pressure vessel 100, but is not limited thereto, and may be performed in a state in which the first crane 500 and second crane 600 are connected to the nuclear reactor pressure vessel 100.

Next, after the nuclear reactor pressure vessel 100 is cut and decommissioned, the bio-protective concrete 300 may be cut and decommissioned.

The bio-protective concrete 300 may be cut and decommissioned by using various known cutting members.

As described above, according to the method for decommissioning the nuclear facility of the embodiment, since the nuclear reactor pressure vessel 100 is separated from the cavity 310 of the bio-protective concrete 300 and then it is not cut or disassembled by being moved to another place, but the nuclear reactor pressure vessel 100 is rotated by 180 degrees to mount the flat upper portion 120 of the nuclear the reactor pressure vessel 100 on the neighboring upper surface 320 and then it is cut and decommissioned, thus it is easy to use the space for cutting and decommissioning the nuclear reactor pressure vessel 100. This serves as a factor to reduce a total decommissioning time and decommissioning cost of the nuclear facility.

That is, the method for dismantling the nuclear facility is provided that easily cuts and decommissions the nuclear reactor pressure vessel 100 separated from the bio-protective concrete 300.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS nuclear reactor pressure vessel 100, cavity 310, neighboring upper surface 320, bio-protective concrete 300, first crane 500, second crane 600

The invention claimed is:

1. A method for decommissioning a nuclear facility that includes a nuclear reactor pressure vessel provided with a hemispherical lower portion and a flat upper portion, and bio-protective concrete including a cavity in which the nuclear reactor pressure vessel is positioned and a neighboring upper surface adjacent to the cavity, comprising:
   floating the nuclear reactor pressure vessel above the cavity;
   rotating the reactor pressure vessel so that the upper portion of the nuclear reactor pressure vessel is closer to the bio-protective concrete than the lower portion;
   mounting the upper portion of the nuclear reactor pressure vessel on the neighboring upper surface of the bio-protective concrete; and
   cutting and decommissioning the nuclear reactor pressure vessel mounted on the neighboring upper surface,
   wherein
   the nuclear facility further includes a first crane positioned above the bio-protective concrete, and
   the floating of the nuclear reactor pressure vessel above the cavity is performed by using the first crane,
   wherein
   the nuclear facility further includes a second crane that is positioned above the bio-protective concrete and is adjacent to the first crane, and
   the rotating of the nuclear reactor pressure vessel is performed by using the first crane and the second crane,
   wherein
   the rotating of the nuclear reactor pressure vessel includes:
   connecting the second crane to the lower portion of the nuclear reactor pressure vessel;
   positioning the upper portion of the nuclear reactor pressure vessel on the neighboring upper surface of the bio-protective concrete slab by using the first crane;
   lifting the lower portion of the nuclear reactor pressure vessel by using the second crane; and
   positioning the lower portion of the nuclear reactor pressure vessel on the neighboring upper surface of the bio-protective concrete slab by using the second crane.

2. The method for decommissioning the nuclear facility of claim 1, wherein
   the floating of the nuclear reactor pressure vessel above the cavity includes:
   connecting the first crane to the upper portion of the nuclear reactor pressure vessel; and
   lifting the nuclear reactor pressure vessel from the bio-protective concrete by using the first crane.

3. The method for decommissioning the nuclear facility of claim 1, wherein
   the nuclear facility further includes a plurality of pipes directly connected to the nuclear reactor pressure vessel, and
   the method further includes: expanding an inner wall of the bio-protective concrete forming the cavity; and
   separating the plurality of pipes from the nuclear reactor pressure vessel.

4. A method for decommissioning a nuclear facility that includes a nuclear reactor pressure vessel provided with a hemispherical lower portion and a flat upper portion, and bio-protective concrete including a cavity in which the nuclear reactor pressure vessel is positioned and a neighboring upper surface adjacent to the cavity, comprising:
   floating the nuclear reactor pressure vessel above the cavity;
   rotating the reactor pressure vessel so that the upper portion of the nuclear reactor pressure vessel is closer to the bio-protective concrete than the lower portion;
   mounting the upper portion of the nuclear reactor pressure vessel on the neighboring upper surface of the bio-protective concrete; and
   cutting and decommissioning the nuclear reactor pressure vessel mounted on the neighboring upper surface,
   wherein
   the rotating of the nuclear reactor pressure vessel includes rotating the nuclear reactor pressure vessel by 180 degrees.

* * * * *